Dec. 29, 1942.    P. T. BRANTINGHAM    2,306,799
SHAFT SHIELDING
Original Filed Jan. 27, 1941
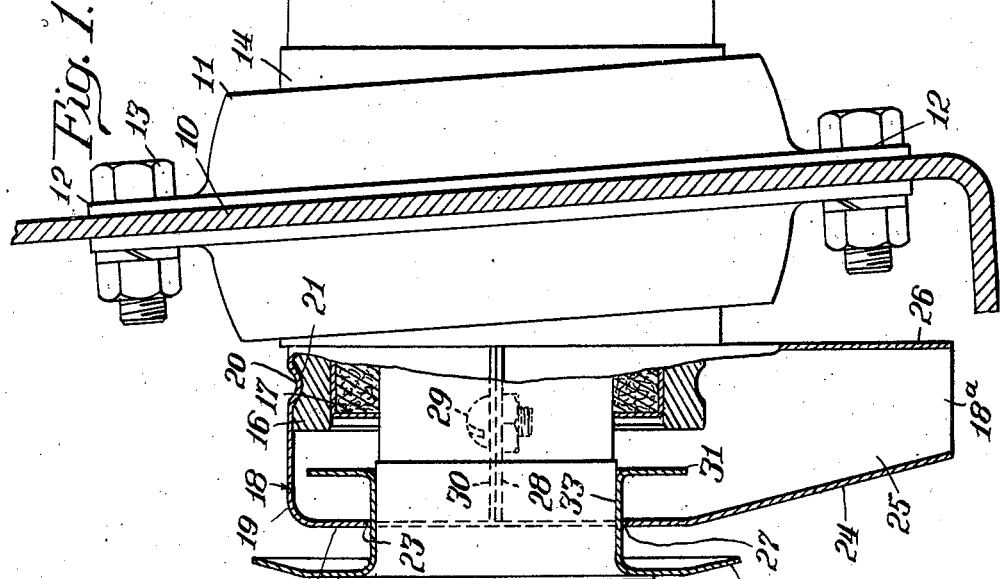
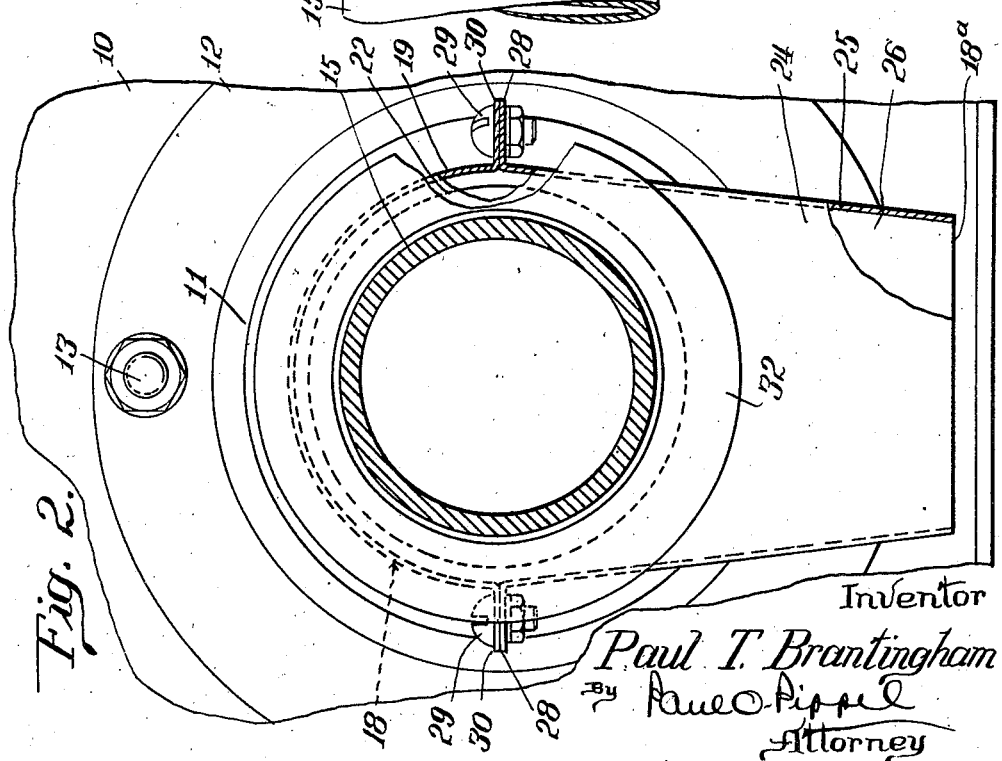
Inventor
Paul T. Brantingham
By Paul O. Pippel
Attorney Patented Dec. 29, 1942

2,306,799

UNITED STATES PATENT OFFICE 2,306,799

SHAFT SHIELDING

Paul T. Brantingham, Fort Wayne, Ind., assignor to International Harvester Company, a corporation of New Jersey Original application January 27, 1941, Serial No. 376,109. Divided and this application July 14, 1941, Serial No. 402,317

1 Claim. (Cl. 286—5)

This invention relates to means for shielding a shaft and its supporting bearing against the entrance of dirt, water, and the like and is a division of application, Serial No. 376,109, filed January 27, 1941.

A device constructed according to the principles of the invention finds its greatest utility in conjunction with the propeller shaft and supporting bearing of a motor vehicle, although the invention is similarly useful in other instances. Taking the use of the invention in a motor vehicle as illustrative, the invention consists in the provision of means adapted to shield and enclose that portion of the shaft which extends from the bearing means, the enclosing means providing in conjunction with one or more flinger elements a means aiding the usual shaft and bearing seal in preventing the entrance of foreign substances to the bearing assembly. The problem under consideration is particularly acute in the propeller shaft mounting on a motor vehicle because of the fact that such mounting is exposed to the dirt and water customarily accumulating on road surfaces, because the travel of the vehicle serves to splash up against the under-side of the vehicle dirt and water from the road.

The principal object of the present invention is to provide means for shielding or sealing the shaft and bearing assembly against the entrance of dirt and water or the like.

An important object is to provide means providing a chamber to enclose the shaft and the proximate bearing portion of the support.

Another important object is to provide one or more flinger elements which are rotatable with the shaft and which serve to discharge radially of the shaft dirt, water, or other foreign substances coming into contact therewith.

Another object is to provide the shielding means on the housing in a simple and inexpensive manner and to adapt the same to be readily mounted on a shaft and bearing assembly.

Other objects and desirable features of the invention will become apparent to those skilled in the art as the disclosure is more fully made in the following detailed description of the invention taken in conjunction with the accompanying sheet of drawing, in which:

Figure 1 is a side elevational view, partially in section, which illustrates a preferred form of the invention as utilized in a propeller shaft and bearing assembly of a motor vehicle; and Figure 2 is an end elevational view of the same, portions of the flinger element and housing being broken away.

As shown in Figure 1, the particular bearing assembly chosen for the purposes of illustration includes a support generally indicated at 10. The support further includes a pair of cup-shaped members 11 each having a flange 12 which is secured by bolts 13 to opposite sides of the wall which forms the support 10. These cups form a spherical mounting in the usual manner for a shaft-supporting bearing 14. This may be of any suitable form and, therefore, has not been illustrated in detail. The bearing 14 serves to journal for rotation therein a shaft 15. This shaft is herein represented as the longitudinally extending propeller shaft of a motor vehicle. It will be understood that the shaft and the support therefor are representative of only one of many instances in which the invention may be used. The bearing 14 includes a circular portion 16 surrounding the shaft 15 and carrying a circular sealing means 17. This means may be of any conventional form and provides a sealing element for sealing the annular space between the portion 15 and the circular portion 16 of the bearing 14. The structure of the circular portion 16 and the sealing means 17 is such as to provide on the bearing 14 a generally radially extending portion surrounding and sealing the shaft 15. The seal is of the type ordinarily sufficient to prevent the entrance of dirt and water to the bearing assembly. However, as has been stated above, the circumstances in which a propeller shaft for a vehicle is utilized make it desirable that additional means be provided for cooperation with the seal in order that adequate means be provided for protecting the assembly.

According to the present invention, there is provided a sealing or housing means for enclosing the end of the bearing and the proximate portion of the shaft. As shown in the drawing, a preferred construction comprises a sheet metal housing 18 including an upper semicylindrical wall 19. This wall encloses the upper portions of the shaft and end of the bearing 14. This wall is further provided with a semicylindrical groove 20 which fits in a corresponding groove 21 formed in the end of the bearing 14. The cooperation between these grooves serves as means by which the housing 18 may be attached to the bearing assembly. The groove 20 further serves as a path along which water may run as it drips off the assembly. The semicylindrical wall 19 is preferably formed integral with a front wall 22 which is disposed substantially transversely and radially as respects the shaft 15. The wall 22 is provided with a semicylindrical opening 23 which closely fits the shaft 15. The housing 18 is completed by the provision of a front wall portion 24 which forms a continuation of the wall 22. The wall 24 is preferably formed integral with a pair of wall sections 25 which extend rearwardly toward the bearing 14 and which are joined by a rear transverse wall 26. The front wall 24 is formed with a semicylindrical opening 27 which, together with the semicylindrical opening 23, forms an opening through which the shaft projects axially away from the support 10. The upper portions of the walls 25 at each side of the housing 18 are respectively provided with ears or flanges 28 which receive securing means in the form of bolts 29 which in turn pass through cooperating flanges or ears 30 on the upper semicylindrical wall surface 19. The rear wall 26 is suitably associated with the proximate end of the bearing 14 so as to form substantially a continuation of the rear portion of the upper semicylindrical wall 19 and to enclose tightly that portion of the bearing 14. The chamber or housing thus formed by the wall sections just described is open at a portion thereof radially of the shaft 15, as at 18a, the opening providing an outlet for dirt and water and the like, as will be presently more fully described.

As best shown in Figure 1, the shaft 15 is provided with a pair of flinger means 31 and 32. According to a preferred embodiment of the invention, the flinger means are formed as a pair of axially spaced circular disks formed integral with a connecting cylindrical sleeve portion 33. This sleeve tightly fits the shaft 15 and passes through the opening formed by the semicircular openings 23 and 27 of the walls 22 and 24 of the housing 18. In this manner the flinger element 31 is disposed inside the chamber formed by the housing 14 and the element 32 is disposed outside the housing.

The diameter of the flinger 31 is preferably greater than the diameter of the circular seal 17 to provide greater protection for the seal, as will hereinafter more fully appear. The diameter of the flinger 32 is preferably greater than the diameter of the circle about which the semicircular portion 19 of the housing 18 is formed, so that the flinger will discharge comparatively large quantities of dirt and water before that dirt and water reaches the opening surrounding the shaft and sleeve of the flinger assembly.

In the operation of motor vehicles fitted with a shaft sealing means of the type herein described, the dirt, water, and other foreign substances which are thrown up against the underside of the vehicle will become directed in the usual manner against the support 10 and the shaft and bearing parts in that vicinity. The accumulation of dirt and water at this time becomes pronounced by the location of the support and the general structure thereof. Furthermore, the vehicle, traveling in the direction of the arrow in Figure 1, causes the dirt and water to splash rearwardly. A support, such as the support 10, ordinarily extends transversely of the vehicle frame, and there is thus provided a pocket into which the dirt and water is most likely to be directed. The dirt and water then run downwardly on the support 10 and over the bearing assembly. In the meantime dirt and water may be continuously splashed up against the entire assembly. Eventually, however, a certain portion of the dirt and water splashed up from the vehicle wheels becomes concentrated about the general vicinity of the support and proximate part of the propeller shaft.

The flinger 32, which operates outside the housing 18, serves to deflect a certain proportion of the dirt and water directed against the assembly. Other portions of the dirt and water will follow the groove 20 in the housing 18 and will drip downwardly from the structure. Other portions of the accumulating dirt and water will run downwardly on the outside of the vertical wall 22 about the shaft 15 and will eventually contact the outer surface of the sleeve 33 of the flinger assembly. Certain portions of the dirt and water will gradually work through the opening about the shaft and flinger sleeve and would ordinarily pass directly to that portion of the shaft surrounded by the seal 17. Such action would increase wear on the seal 17 until the seal would be inadequate to prevent the loss of lubricant and also the entrance of the foreign substances into the interior of the bearing assembly. In the present instance, however, the rotating flinger 31 catches the combined dirt and water and directs it radially outwardly against the inside of the walls 19 and 25. By this time the accumulated dirt and water has been reduced to a comparatively fine spray and the drops thereof adhere to the inner surfaces of the housing 18 and run down along the sides thereof and out through the open bottom or outlet 18a of the housing. It will thus be seen that the dirt and water or the like contact first the flinger 32, and then the wall 22, and then the flinger 31, and are discharged either outside or inside the chamber until the particles have been reduced rather minutely, in which condition the foreign substances will readily discharge through the opening 18a at the bottom of the housing 18.

It will be seen from the foregoing description that the function of the shield or deflecting structure is such as to prevent the entrance of dirt, water, or the like to the vicinity of the seal 17. Thus, the life of the seal is materially increased, and the problems usually attendant upon the deterioration of the seal are eliminated.

It will be understood that the foregoing description is of a preferred embodiment of the invention and that numerous modifications and alterations may be made therein without departing from the spirit and scope of the invention as defined in the appended claim.

What is claimed is:

A slinger seal means for attachment to a support from which a rotatable shaft extends, comprising a two-part sheet metal enclosure member adapted to be secured to the support and to form a chamber surrounding the shaft outside the support, said enclosure member having a first opening through which the shaft extends outside the member and a second opening providing a drain, said member further having an external peripheral drain groove, and a sheet metal double slinger element extending through the aforesaid first opening and including a sleeve portion adapted to be carried by and for rotation with the shaft and having a first slinger integral with the sleeve and disposed inside the enclosure member and a second slinger integral with the sleeve and disposed outside the closure member.

PAUL T. BRANTINGHAM.